UNITED STATES PATENT OFFICE.

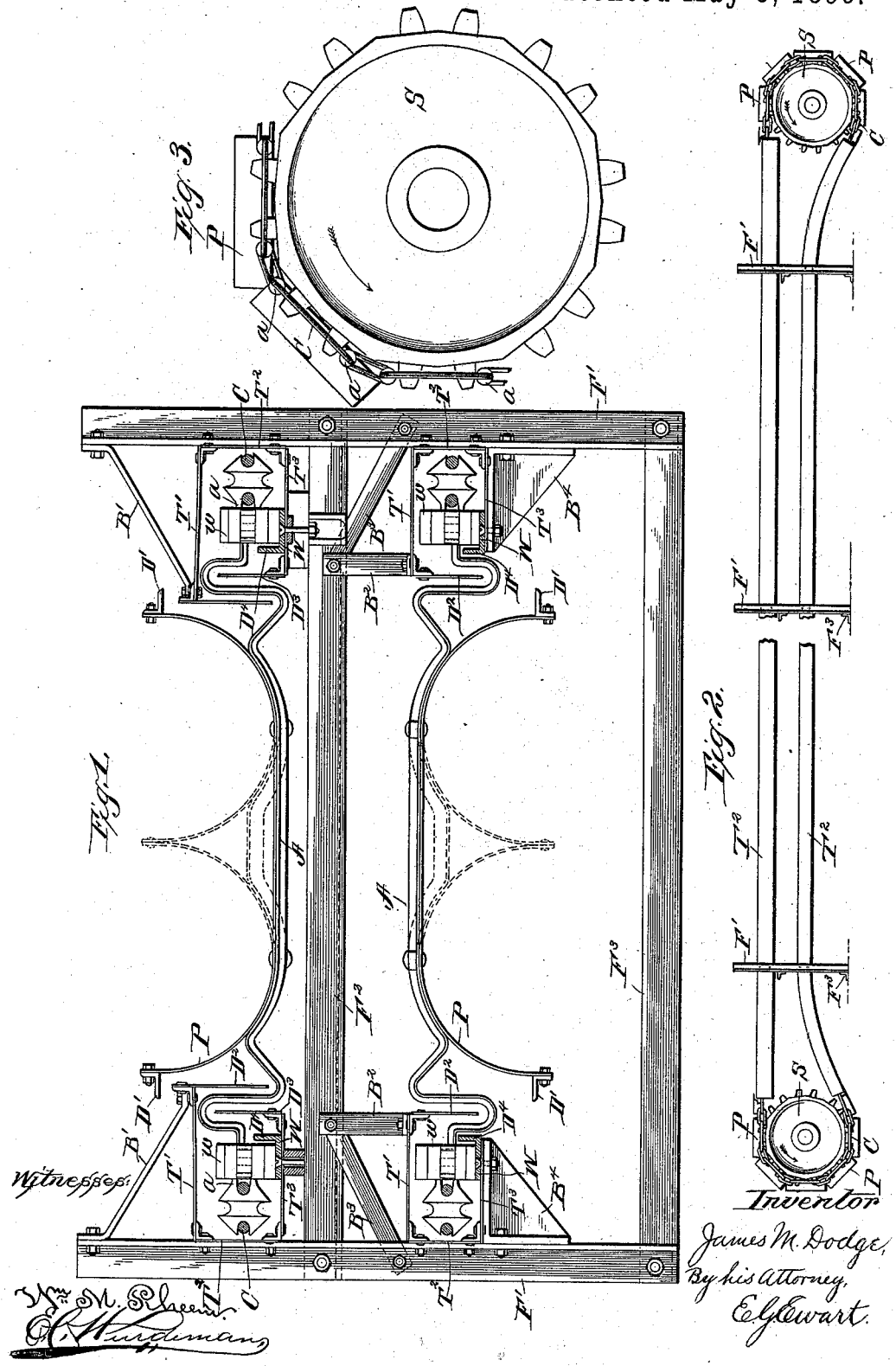

JAMES M. DODGE, OF PHILADELPHIA, PENNSYLVANIA, ASSIGNOR TO THE LINK-BELT ENGINEERING COMPANY, OF SAME PLACE.

CONVEYER.

SPECIFICATION forming part of Letters Patent No. 559,370, dated May 5, 1896.

Application filed October 5, 1891. Serial No. 407,671. (No model.)

*To all whom it may concern:*

Be it known that I, JAMES M. DODGE, a citizen of the United States, residing at Philadelphia, in the county of Philadelphia and State of Pennsylvania, have invented certain new and useful Improvements in Conveyers, of which the following is a specification.

In the construction of endless-chain conveyers for handling materials which, through grit, dust, or otherwise, would have a tendency to wear out the chains rapidly, various expedients have been adopted to prevent the injurious effects—such, for instance, as the use of flights or scrapers suspended from cross-bars, to the outer ends of which the chains have been attached, thus removing the chains from direct contact with the material, or the use of endless aprons composed of slats or platforms, or the employment of troughs composed of sections or pans, to the outer ends or under side of which the chain or chains could be attached, such platforms or pans being in some cases carried by an arrangement of outriggers or gudgeons suitably attached and bearing rollers or wearing-blocks to sustain the weight, and in other cases being carried over a series of rollers or other suitable supports placed permanently in position under the moving apron or trough. In all these constructions, however, there has been more or less trouble from the tendency of the fine particles of gritty and dusty materials to sift down through the conveyer or the light particles to float in the air to the sides and settle on the chain and work into its joints or work into the journal-bearings of the rollers and cause rapid wear. I have found it necessary, therefore, to devise some means of removing the chain and wearing-supports to a practically dust-proof chamber or channel where grease or other lubricant can be freely applied to all wearing parts without danger of foreign substances working in.

My invention relates to the class of conveyers used for handling materials which, through grit, dust, or otherwise, would have a tendency to injure the wearing parts of the outfit; and its object is to remove said wearing parts effectually from danger of contact with particles of the said materials.

To enable those skilled in the art to which my improvements relate to understand and practice the same, I will now proceed to describe my invention more fully, referring to the accompanying drawings, which form part of this specification, and in which similar letters of reference designate similar parts throughout the several views.

Figure 1 is a cross-section of an endless trough conveyer using my device, showing both the carrying and returning lines of pans or sections of which the trough is made. Fig. 2 is a side elevation of the conveyer drawn on a smaller scale. Fig. 3 shows, on a scale larger than Fig. 2 and smaller than Fig. 1, the relative position of two of the pans or sections passing around the head in the direction indicated by the arrow.

C is a cable-chain, and $a$ an attachment-block in same.

A is a bent arm or cross-piece reaching from one chain or cable to the other and carrying pans or sections P, which are attached thereto, preferably by riveting. The dust-proof tube, box, or channel in which the chain runs I prefer to make of sheet-iron, T' being the top sheet, $T^2$ the outer side, and $T^3$ the bottom. On the side toward the pans, where the arms A must be provided for without letting dust or other material in I arrange guards for each chain of the carrying-run as follows:

D' is a narrow strip, preferably composed of angle-iron, attached to the outer side of the pan, about as shown, although sometimes formed integral therewith.

$D^2$ is a vertical side strip suspended from the inner edge of T'.

$D^3$ is another vertical side strip extending upward from the inner edge of $T^3$ in the carrying-run.

$D^4$ is the vertical side of an angle-iron strip whose horizontal side $w$ lies on $T^3$, being suitably attached thereto and acting as a wearing-strip or carrying-way on which the wearing-block $w$ slides. In the returning-run, where there is not so much dust, &c., to contend with, the pieces $D^2$ and $D^4$ answer the requirements of guards. The arm or crosspiece A is suitably bent to pass under and over the various guards, as shown, without interference. The wearing-blocks $w$ are conveniently attached to the chains and cross-arms in such a manner as to sustain the entire weight both in the carrying and returning runs, and are arranged to be easily taken off and replaced when repairs are necessary. The framework which carries the lines of tubes or channels I make preferably of angle-iron, the main uprights being $F'$ and the cross ties or bars $F^2$ and $F^3$. Braces $B'$ and $B^2$, in the case of the upper and lower runs, respectively, sustain the inner portions of the tops of the tubes $T'$, with their guards $D^2$.

$B^3$ strengthens or stiffens $F^2$ in the vicinity of its most strained portions and acts as a tie or brace to hold the whole framework rigid.

$B^4$ are preferably brace-like castings or brackets which carry the lower tubes for the returning-run of trough.

S is a sprocket-wheel over which chain C runs.

The general construction of my device will be largely understood from the foregoing description and the drawings. The conveyer-chains, which may be of any convenient type, are preferably provided with right and left hand attachments projecting toward the conveyer-trough about on the pitch-lines of the chains. To these are fastened cross-pieces or carrying-arms A, which I have thus far made of malleable iron, so strengthened with stiffening-ribs as to enable them to carry the weight of the loaded pans or sections without yielding materially. It will be noticed that in the form herewith illustrated the principal guards $D^2$ and $D^3$ (and in the case of the returning-line $D^2$ and $D^4$) overlap each other transversely to the line of motion—that is, the bottom of the guard $D^2$ nearest the moving conveyer-trough extends downward to a lower level than the top of its neighbor $D^3$ or $D^4$. It will also be observed that a leading element in the protection of the chains is the fact that on the sides toward the conveying devices the guards overlap the pitch-lines of the chains. Such an arrangement is adopted in order to prevent currents of air carrying the fine particles sidewise from the conveyer into the tubes or channels. The carrying-arms A are therefore formed with crooks or bends at or near each end to suit the spaces allowed for their movement between the overlapping guards in a manner substantially similar to that shown in the drawings.

In the form illustrated it will be seen that the entire weight of the chains, cross-pieces, and loaded conveyer trough-sections or pans will come on the wearing-blocks $w$. It is an easy matter to keep the carrying-ways W well slushed with grease or other lubricant, thus reducing the friction to a minimum. Rollers or small wheels could be used instead of wearing-blocks; but as the latter are cheap, can easily be kept lubricated, and can readily be replaced when worn out they are preferable in ordinary work. I generally make these blocks in two parts adapted to clasp the attachments of the chains and the ends of the arms A together and to be held in place by bolts, pins, or other suitable devices.

The use of angle-iron for the carrying-ways W has several advantages, among which are the following: The upright portions $D^4$ prevent any tendency toward a side motion of the conveyer which would cut out the side strips $T^2$ or an interference of the bent portions of the arms A with guards $D^2$ and $D^3$. For instance, $D^4$ in the right-hand tube limits the movement toward the left, while $D^4$ in the left-hand tube limits the movement toward the right. These also act partially as dust-guards, as mentioned above, and further serve to hold the grease or other lubricant in the channel where it is most needed for the wearing-blocks and chains.

The pans or trough-sections are generally arranged to overlap each other in a longitudinal direction to prevent as far as possible any tendency of the material to sift down through the conveyer, and it is preferable to have each pan overlap the one ahead of it, somewhat as shown in Fig. 3, to prevent the material dropping down between the pans at the discharge end when they are drawn more or less apart in passing around the curves. Ordinarily there is but one line of pans forming one carrying-trough; but where two or more kinds, grades, or sizes of coal or other material are to be handled in the same direction at the same time, or there is any other reason for multiplying the number of carrying-troughs, I arrange them side by side on the arms, somewhat as illustrated in dotted lines in Fig. 1. These pans may be formed each of one sheet properly bent, or of two or more sheets suitably secured by rivets or bolts, and for the purposes of this invention they may be of various shapes, sizes, &c., to suit the requirements.

The narrow strips $D'$ on the outer edges of the pans are preferably made a little shorter than the pans, so as not to interfere with the easy overlapping of the latter. These strips while acting as dust-guards also serve to prevent lumps of coal or other irregular-shaped material dropping in between the sides of the pans and the tops of the tubes and becoming wedged there. In conveyers constructed for use out of doors I incline the tops of the tubes $T'$ slightly to shed the water. In order to make the main conveyer occupy as little space as possible, I arrange to contract the space between upper and lower runs vertically after leaving the wheels at each end, somewhat as illustrated in Fig. 2. I prefer to form the tubes in sections of about eight-foot length, arranging for suitable connections at the points where the frames are introduced to support the outfit, and I ordinarily set the frames directly on flooring or other suitable foundation, making the conveyer secure in position by bolting down the $F^3$ pieces.

Of course it will be understood that some of the leading features of my improvements are applicable where the endless-conveyer trough above mentioned is replaced by a series of separate carriers, or an apron composed of platforms or slats, or by cross-bars provided with scrapers which project down into an ordinary conveyer-trough, or in fact by any other form of conveying device in which it is desirable to remove the carrying chains or ropes and the wearing-supports as effectually as possible from the deleterious influence of the material handled. This deleterious influence may not always arise from gritty dust, as other materials—such, for instance, as chemicals of various sorts—might be handled by pans, platforms, or other carriers which are formed of material of a special nature not affected by the articles handled, while the conveying-cables and wearing-supports are made of ordinary construction and material which needs to be protected.

The same general principles of construction I apply to elevators, with slight modifications in details to suit the special circumstances, the leading feature being that the chains or cables move in channels protected by or formed with guards which overlap the pitch-lines of said chains or cables on the sides toward the carrying devices, and that the cross-pieces connecting them are bent in such a shape as to pass easily through the longitudinally-disposed openings in said channels.

It will of course be understood that the arms can either be cast in shape at the outset or formed out of straight pieces by bending, and that scrapers or other conveying devices could be formed integrally with them, as well as attached to them, if so desired. It is also evident that in the form of channels illustrated in the drawings it is not absolutely essential (although preferable) that the outer sides should be closed, as at $T^2$, and in fact among the various forms which I have devised for this work there are some in which the openings to accommodate the bent arms were arranged to be on the outer sides.

As a further modification coming within the spirit of my invention I sometimes divide the cross-arm A into two pieces, attaching them to the outer portions of the pans or other conveying devices, where such pans or conveying devices are made of sufficiently-stiff material to sustain themselves properly in this manner. I also arrange in cheap forms to use but one chain and one protecting tube or channel, employing, however, in all such cases a bent arm reaching from the conveying device to the chain and guards which overlap each other or overlap the pitch-line of the chain on the side toward the conveying devices.

I am aware that slight covers or sheds have been placed over conveyer-chains to protect them in a general way from material falling on them; but these did not overlap the pitch-lines of the chains and come down between them and the conveying devices in such a manner as to form a real protection which would be so complete as to permit the free use of grease on the chains and wearing-supports, while my improvements accomplish all this nicely. In the ordinary construction of double-strand conveyers the aim has been to keep the conveying devices about on the pitch-lines of the chains, so that in passing over the wheels they will neither be crowded nor separated unduly, and to this end the cross-pieces have been made practically straight, which would not permit the use of guards overlapping the pitch-lines of the chains in the manner which I have described.

While I consider the form shown herein as practically the best which I have thus far employed for the work I had in hand, I do not wish to be limited to this specific type in details of proportions, shapes, or other arrangements; but,

Having thus fully described my invention, what I claim, and desire to secure by Letters Patent, is—

1. In a carrier, an endless chain or cable, conveying devices connected with the same, bent cross-pieces for making said connections, and longitudinally-disposed guards which overlap the pitch-line of said chain or cable on the side toward the conveying devices, substantially as and for the purpose set forth.

2. In a carrier, an endless chain or cable, conveying devices connected with the same, bent cross-pieces for making said connections, and longitudinally-disposed guards which overlap each other for the protection of said chain or cable, substantially as set forth.

3. In a carrier employing an endless chain or cable provided with conveying devices which are connected therewith by bent cross-pieces, a protecting-channel for said chain or cable provided with a longitudinally-disposed opening to accommodate said cross-pieces and with a portion which overlaps the pitch-line of the chain or cable on the side toward the conveying devices, substantially as and for the purpose set forth.

4. In a carrier employing two strands of chain connected by cross-pieces which are provided with conveying devices, protecting-channels for said chains provided with longitudinally-disposed openings to accommodate said cross-pieces and with portions which overlap the pitch-lines of the chains on the sides toward the conveying devices, substantially as and for the purpose described.

5. In a carrier, an endless chain or cable, conveying devices connected therewith, bent cross-pieces, wearing-supports, channels, carrying-ways for said wearing-supports in said channels, and guards arranged to protect the wearing-surfaces from contact with injurious substances, substantially as set forth.

6. In a conveyer, the combination of two parallel endless chains or cables, cross-pieces connecting the same, and parallel lines of conveying receptacles borne by said cross-pieces between the said chains, substantially as and for the purpose described.

JAMES M. DODGE.

Witnesses:
W. E. GRAY,
M. GETZ.